United States Patent
Kerby et al.

(10) Patent No.: US 12,017,623 B2
(45) Date of Patent: Jun. 25, 2024

(54) SERIES-CONNECTED BRAKE ACTUATORS AND AUTOMATIC BRAKE HOLD METHOD EMPLOYING SAME

(71) Applicant: ADVICS North America, Inc., Lebanon, OH (US)

(72) Inventors: Mark Kerby, Plymouth, MI (US); Josh Heyden, Plymouth, MI (US); Marc Basta, Plymouth, MI (US); Ryuzo Tsuruhara, Plymouth, MI (US)

(73) Assignee: ADVICS CO., LTD., Kariya (JP)

( * ) Notice: Subject to any disclaimer, the term of this patent is extended or adjusted under 35 U.S.C. 154(b) by 755 days.

(21) Appl. No.: 17/159,861

(22) Filed: Jan. 27, 2021

(65) Prior Publication Data

US 2022/0234559 A1 Jul. 28, 2022

(51) Int. Cl.
| | |
|---|---|
| *B60T 13/68* | (2006.01) |
| *B60T 8/17* | (2006.01) |
| *B60T 11/10* | (2006.01) |
| *B60T 11/24* | (2006.01) |
| *B60T 13/14* | (2006.01) |
| *B60T 15/02* | (2006.01) |

(52) U.S. Cl.
CPC .............. *B60T 11/105* (2013.01); *B60T 8/17* (2013.01); *B60T 11/24* (2013.01); *B60T 13/145* (2013.01); *B60T 13/686* (2013.01); *B60T 15/028* (2013.01); *B60T 2201/00* (2013.01); *B60T 2270/402* (2013.01)

(58) Field of Classification Search
CPC .......... B60T 8/17; B60T 11/105; B60T 11/24; B60T 13/145; B60T 13/686; B60T 15/028; B60T 2201/00; B60T 2270/402
See application file for complete search history.

(56) References Cited

U.S. PATENT DOCUMENTS

| | | | | |
|---|---|---|---|---|
| 9,205,821 | B2 * | 12/2015 | Biller | B60T 13/686 |
| 9,308,905 | B2 * | 4/2016 | Biller | B60T 13/686 |
| 9,421,957 | B2 * | 8/2016 | Murayama | B60T 7/042 |
| 9,561,787 | B2 * | 2/2017 | Quirant | B60T 13/662 |
| 10,300,896 | B2 * | 5/2019 | Jones | B60T 8/321 |
| 10,358,119 | B2 * | 7/2019 | Besier | B60T 13/142 |
| 10,391,990 | B2 * | 8/2019 | Kuhlman | B60T 8/4081 |
| 10,479,335 | B2 * | 11/2019 | Kuhlman | B60T 13/166 |
| 10,752,228 | B2 * | 8/2020 | Peichl | B60T 8/4081 |

(Continued)

*Primary Examiner* — Thomas W Irvin
(74) *Attorney, Agent, or Firm* — BUCHANAN INGERSOLL & ROONEY PC

(57) ABSTRACT

A brake system includes a master cylinder configured to generate a hydraulic pressure, a primary brake actuator configured to increase and decrease the hydraulic pressure generated in the master cylinder, a secondary brake actuator connected in series with and downstream of the master cylinder and in series with and upstream of the primary brake actuator, and configured to increase and decrease the hydraulic pressure generated in the master cylinder, and at least one wheel cylinder configured to apply brake torque to a wheel of a vehicle based on the hydraulic pressure generated by the master cylinder and increased or decreased by the primary actuator or the secondary actuator. An automatic brake hold control method includes sequential performing an automatic brake hold control on at least one wheel cylinder by the primary brake actuator and then the secondary brake actuator.

9 Claims, 6 Drawing Sheets

(56) References Cited

U.S. PATENT DOCUMENTS

| | | | | |
|---|---|---|---|---|
| 10,800,388 | B2* | 10/2020 | Besier | B60T 8/4072 |
| 11,001,245 | B2* | 5/2021 | Dinkel | B60T 13/161 |
| 11,465,602 | B2* | 10/2022 | Neu | B60T 8/885 |
| 11,548,490 | B2* | 1/2023 | Weitze | B60T 8/17 |
| 2009/0195056 | A1 | 8/2009 | Nasu et al. | |
| 2015/0061363 | A1* | 3/2015 | Murayama | B60T 8/38 |
| | | | | 303/14 |
| 2017/0129469 | A1* | 5/2017 | Besier | B60T 13/142 |
| 2017/0282877 | A1* | 10/2017 | Besier | B60T 8/885 |
| 2018/0099650 | A1* | 4/2018 | Jones | B60T 7/042 |
| 2018/0162332 | A1* | 6/2018 | Nakazawa | B60T 7/22 |
| 2019/0016321 | A1* | 1/2019 | Dinkel | B60T 8/4081 |
| 2019/0193701 | A1* | 6/2019 | Kuhlman | B60T 13/166 |
| 2019/0217834 | A1* | 7/2019 | Maruo | B60T 8/4081 |
| 2019/0241167 | A1* | 8/2019 | Peichl | B60T 13/165 |
| 2020/0198607 | A1* | 6/2020 | Weitze | B60T 8/4081 |
| 2020/0361439 | A1* | 11/2020 | Neu | B60T 13/146 |
| 2021/0347348 | A1* | 11/2021 | Adler | B60T 13/683 |
| 2021/0394729 | A1* | 12/2021 | Seol | B60T 8/885 |

\* cited by examiner

SERIES-CONNECTED BRAKE ACTUATORS AND AUTOMATIC BRAKE HOLD METHOD EMPLOYING SAME

FIELD OF THE INVENTION

The present invention relates generally to series-connected brake actuators and an automatic brake hold method employing series-connected brake actuators.

BACKGROUND

In an era of electric and hybrid electric vehicles, the demands on the vehicle batteries have dramatically increased. Advances in other onboard electrical systems also contribute to the increased demand. Furthermore, critical vehicle systems, such as brake actuators, continue to run on battery power. Thus, a need exists for a brake actuator arrangement that is configured to conserve battery power.

SUMMARY

A brake system includes a master cylinder configured to generate a hydraulic pressure, a primary brake actuator configured to increase and decrease the hydraulic pressure generated in the master cylinder, a secondary brake actuator connected in series with and downstream of the master cylinder and in series with and upstream of the primary brake actuator, and configured to increase and decrease the hydraulic pressure generated in the master cylinder, and at least one wheel cylinder configured to apply brake torque to a wheel of a vehicle based on the hydraulic pressure generated by the master cylinder and increased or decreased by the primary actuator or the secondary actuator.

An automatic brake hold control method includes performing an automatic brake hold control on at least one wheel cylinder by a primary brake actuator, and, after performing the automatic brake hold control on the at least one wheel cylinder by the primary brake actuator, performing the automatic brake hold control on the at least one wheel cylinder by a secondary brake actuator.

DETAILED DESCRIPTION

Set forth below with reference to the accompanying drawings is a detailed description of embodiments of series connected dual brake actuators and an automatic brake hold method, representing examples of the inventive series connected dual brake actuators and automatic brake hold method.

Figure 1:
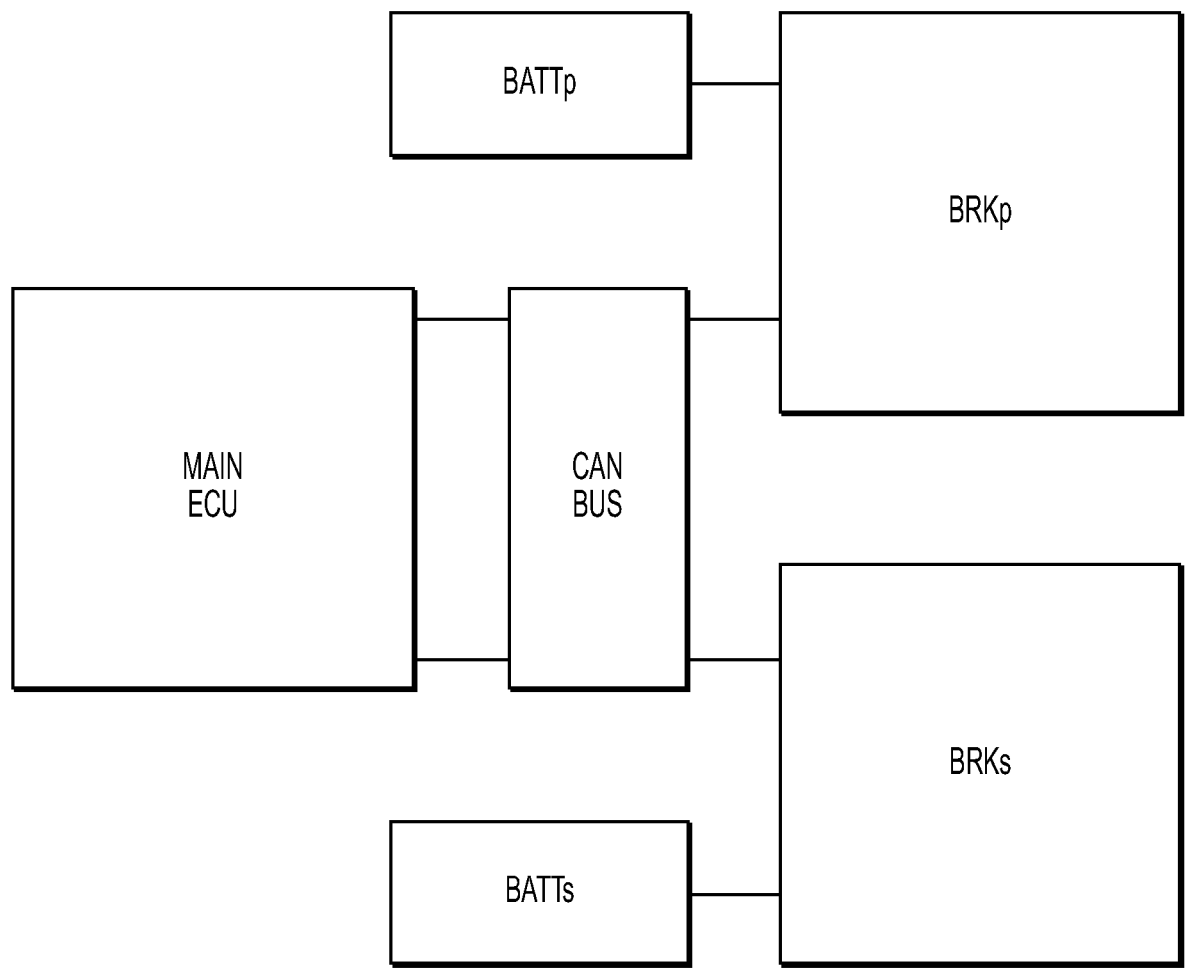
FIG. 1 illustrates an overall schematic view of a brake system according to an embodiment.

FIG. 1 illustrates an overall schematic view of a vehicle brake system according to an exemplary embodiment. As shown in the figure, the vehicle's main ECU, which is configured as, for example, a programmed microcomputer operatively connected to various onboard sensors, is operatively connected to the primary brake actuator BRKp and the secondary brake actuator BRKs by, in the embodiment, a Controller Area Network (CAN bus), which is a known vehicle bus standard designed to allow microcontrollers and devices to communicate with each other's applications. The main ECU can also be operatively connected to, for example, an engine-specific control unit among other components outside the brake system by the CAN bus. Furthermore, the primary brake control unit ECUbp of the primary brake actuator BRKp is powered by the vehicle's primary battery BATTp, while the secondary brake control unit ECUbs of the secondary brake actuator BRKs is powered by the vehicle's secondary battery BATTs.

Figure 2A:
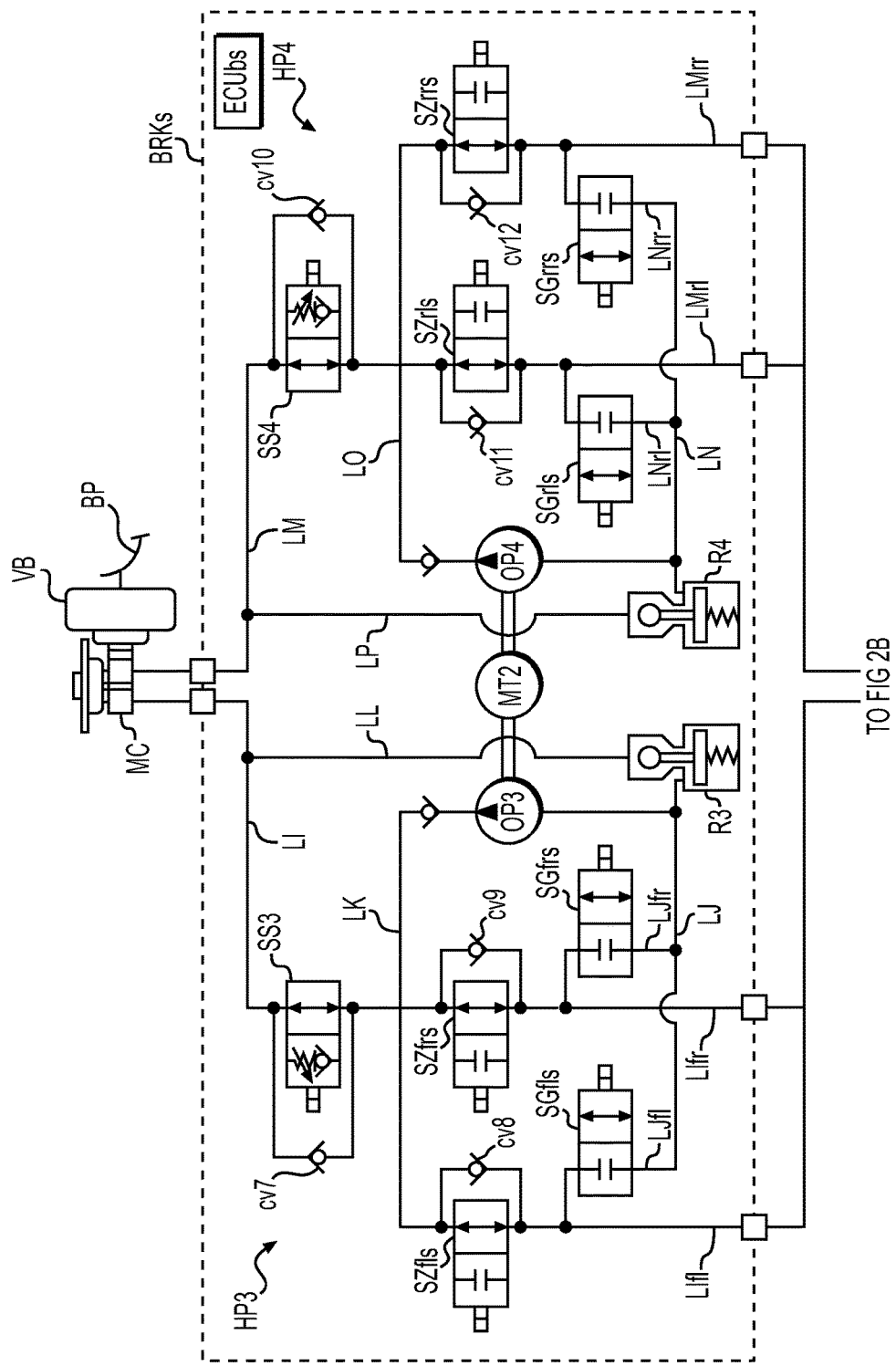
FIGS. 2A and 2B illustrate a schematic view of the series connected dual brake actuators according to the exemplary embodiment.
Figure 2B:
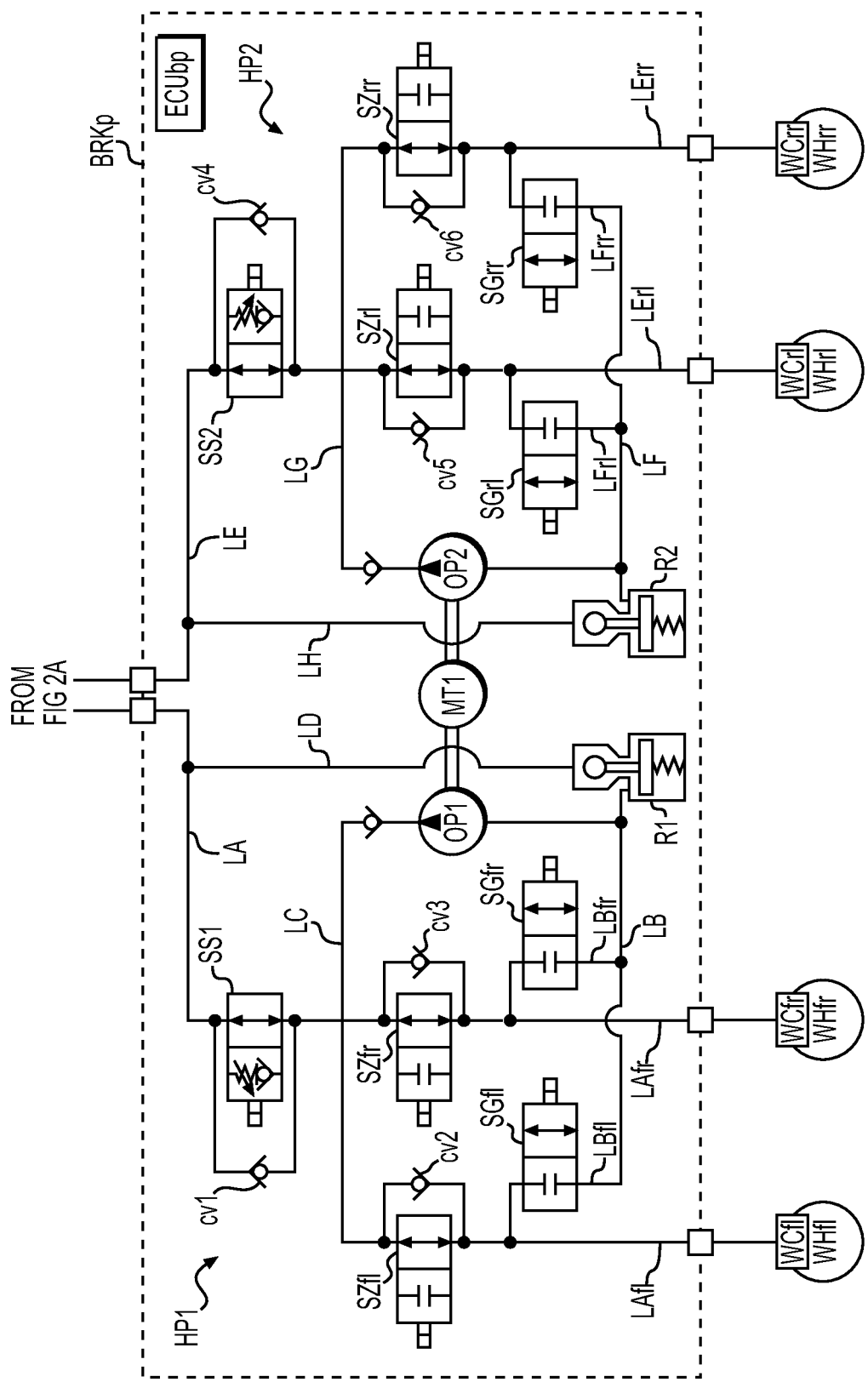

FIGS. 2A and 2B illustrate a schematic view of the series connected dual brake actuators according to the exemplary embodiment. A brake operating member BP (e.g. a brake pedal) is operatively connected to a master cylinder MC and a brake booster VB such that, when the brake operating member BP is depressed, the generated depression force is boosted by the booster VB, so that a master piston provided at the master cylinder MC is pressed, and a same degree of a master cylinder hydraulic pressure is generated at a first chamber and a second chamber which are defined within the master cylinder MC. Under normal operation, the master cylinder hydraulic pressure is applied to the wheel cylinders WCfl, WCfr, WCrl, and WCrr of the corresponding front-left wheel WHfl, front-right wheel WHfr, rear-left wheel WHrl and rear-right wheel WHrr of the vehicle, via primary brake actuator BRKp and secondary brake actuator BRKs, which are described in detail below.

The primary brake actuator BRKp includes differential pressure control valves SS1 and SS2, and the secondary brake actuator BRKs includes differential pressure control valves SS3 and SS4. The differential pressure control valves SS1, SS2, SS3, and SS4 are independently controllable to be in a communication state or a differential pressure control state. In the communication state, brake fluid flows through the conduit in which the differential pressure control valve SS1, SS2, SS3, or SS4 is disposed without generating a differential pressure. In other words, a degree of the hydraulic pressure at the conduit at an upstream side relative to the differential pressure control valve SS1, SS2, SS3, or SS4 is the same as the degree of the hydraulic pressure at a downstream side relative to the differential pressure control valve SS1, SS2, SS3, or SS4. On the other hand, in the differential pressure generating state, a pressure difference is generated between the hydraulic pressure within the conduit at the upstream side relative to the differential pressure control valve SS1, SS2, SS3, or SS4 and the hydraulic pressure at the conduit at the downstream side relative to the differential pressure control valve SS1, SS2, SS3, or SS4.

Furthermore, the primary brake actuator BRKp includes pressure increase control valves SZfl, SZfr, SZrl, and SZrr, and the secondary brake actuator BRKs includes pressure increase control valves SZfls, SZfrs, SZrls, and SZrrs. The pressure increase control valves SZfl, SZfr, SZrl, SZrr, SZfls, SZfrs, SZrls, and SZrrs are two position electromagnetic valves, which are independently controllable between a communication establishing state (i.e. a state where the brake fluid is allowed to flow through the two position electromagnetic valve) and a communication interrupting state (i.e. a state where the flow of the brake fluid is interrupted). In particular, in a case where an electric current supplied to the pressure increase control valve SZfl, SZfr, SZrl, SZrr, SZfls, SZfrs, SZrls, or SZrrs is zero (0), in other words, in a case where the electricity is not supplied to the valve, the communication establishing state is established (i.e., the valve is controlled to be in an opened state). On the other hand, in a case where the electric current is supplied to the pressure increase control valve SZfl, SZfr, SZrl, SZrr, SZfls, SZfrs, SZrls, or SZrrs, in other words, in a case where the valve is energized, the communication interrupting state is established (i.e., the valve is controlled to be in an closed state). In other words, each of the pressure increase control valves SZfl, SZfr, SZrl, SZrr, SZfls, SZfrs, SZrls, and SZrrs is configured as a so-called normally-opened type valve.

Additionally, the primary brake actuator BRKp includes pressure decrease control valves SGfl, SGfr, SGrl, and SGrr, and the secondary brake actuator BRKs includes pressure decrease control valves SGfls, SGfrs, SGrls, and SGrrs. The pressure decrease control valves SGfl, SGfr, SGrl, SGrr, SGfls, SGfrs, SGrls, and SGrrs are two position electromagnetic valves, which are independently controllable between a communication establishing state (i.e. a state where the brake fluid is allowed to flow through the two position electromagnetic valve) and a communication interrupting state (i.e. a state where the flow of the brake fluid is interrupted). In particular, in a case where an electric current supplied to the pressure decrease control valve SGfl, SGfr, SGrl, SGrr, SGfls, SGfrs, SGrls, or SGrrs is zero (0), in other words, in a case where the electricity is not supplied to the valve, the communication interrupting state is established (i.e., the valve is controlled to be in a closed state). On the other hand, in a case where the electric current is supplied to the pressure decrease control valve SGfl, SGfr, SGrl, SGrr, SGfls, SGfrs, SGrls, or SGrrs, the communication establishing state is established (i.e., the valve is controlled to be in an opened state). In other words, each of the pressure decrease control valves SGfl, SGfr, SGrl, SGrr, SGfls, SGfrs, SGrls, and SGrrs is configured as a so-called normally-closed type valve.

The primary brake actuator BRKp is a front-rear circuit system, including a brake circuit HP1, a brake circuit HP2, and a primary brake control unit ECUbp configured as, for example, a programmed microcomputer. The brake circuit HP1 includes a conduit LA in which differential pressure control valve SS1 is provided, and through which, under normal brake operation, the master cylinder hydraulic pressure generated by operation of the brake pedal BP is transmitted, via the secondary brake actuator BRKs, to the wheel cylinders WCfl and WCfr. A valve position of the differential pressure control valve SS1 is controlled to be at an opened state, so that the communication state is established at the differential control valve SS1 in a case where brake control at wheel cylinders WCfl and WCfr is not executed by the primary brake actuator BRKp. When electricity is supplied to the differential pressure control valve SS1 by the primary brake control unit ECUbp, the valve position of the differential pressure control valve SS1 is controlled to be in a closed state, so that the differential pressure generating state is established at the differential pressure control valve SS1. A check valve cv1 is provided in parallel to the differential pressure control valve SS1 to bypass the differential pressure control valve SS1 in the event that the hydraulic pressure upstream of the differential pressure control valve SS1 becomes greater than the hydraulic pressure downstream of the differential pressure control valve SS1.

The conduit LA branches into conduit LAfl and conduit LAfr downstream of the differential pressure control valve SS1. A pressure increase control valve SZfl for controlling a pressure increase of the brake hydraulic pressure supplied to the wheel cylinder WCfl is provided at the conduit LAfl. A pressure increase control valve SZfr for controlling a pressure increase of the brake hydraulic pressure supplied to the wheel cylinder WCfr is provided at the conduit LAfr. Pressure increase control valves SZfl and SZfr are individually energizable by the primary brake control unit ECUbp. Check valves cv2 and cv3 are provided in parallel to the pressure increase control valves SZfl and SZfr, respectively, to bypass the respective pressure increase control valve SZfl or SZfr in the event that the hydraulic pressure downstream of the respective pressure increase control valve SZfl or SZfr becomes greater than the hydraulic pressure upstream of the respective pressure increase control valve SZfl or SZfr.

A conduit LB used for decreasing the brake hydraulic pressure extends from a regulating reservoir R1 and branches into conduits LBfl and LBfr. Conduit LBfl connects the regulating reservoir R1 to a portion of the conduit LAfl extending between the pressure increase control valve SZfl and the wheel cylinder WCfl, and conduit LBfr connects the regulating reservoir R1 to a portion of the conduit LAfr extending between the pressure increase control valve SZfr and the wheel cylinder WCfr. Pressure decrease control valve SGfl is provided in conduit LBfl, and pressure decrease control valve SGfr is provided in conduit LBfr. Pressure decrease control valves SGfl and SGfr are individually energizable by the primary brake control unit ECUbp.

A conduit LC is provided between the regulating reservoir R1 and the conduit LA, and connects to the conduit LA at or upstream of the split of conduit LA into LAfl and LAfr, and downstream of the differential pressure control valve SS1. A conduit LD is provided between the regulating reservoir R1 and the master cylinder MC (via the secondary brake actuator BRKs). A hydraulic pump OP1 operatively connected to an electric motor MT1 is provided at the conduit LC. When the electric motor MT1 is energized by the primary brake control unit ECUbp to cause the hydraulic pump OP1 to be driven by the electric motor MT1, brake fluid sucked by the hydraulic pump OP1 from the regulating reservoir R1, is discharged to the master cylinder MC (via the secondary brake actuator BRKs) or one or both of the wheel cylinders WCfl and WCfr.

The brake circuit HP2 is similar to the brake circuit HP1 except that it supplies brake fluid to the wheel cylinders WCrl and WCrr. The differential pressure control valve SS2, pressure increase control valves SZrl and SZrr, pressure decrease control valves SGrl and SGrr, check valves cv4, cv5, and cv6, regulating reservoir R2, hydraulic pump OP2, and conduits LE, LErl, LErr, LF, LFrl, LFrr, LG, and LH of the brake circuit HP2 are arranged and function in a manner corresponding to that of the differential pressure control valve SS1, pressure increase control valves SZfl and SZfr, pressure decrease control valves SGfl and SGfr, check valves cv1, cv2, cv3, regulating reservoir R1, hydraulic pump OP1, and conduits LA, LAfl, LAfr, LB, LBfl, LBfr, LC, and LD of the brake circuit HP1.

The secondary brake actuator BRKs is a front-rear circuit system, including a brake circuit HP3, a brake circuit HP4, and a secondary brake control unit ECUbs configured as, for example, a programmed microcomputer. The brake circuit HP3 includes a conduit LI in which differential pressure control valve SS3 is provided, and through which, under normal brake operation, the master cylinder hydraulic pressure generated by operation of the brake pedal BP is transmitted to the brake circuit HP1 of the primary brake actuator BRKp. A valve position of the differential pressure control valve SS3 is controlled to be at an opened state, so that the communication state is established at the differential control valve SS3 in a case where brake control at wheel cylinders WCfl and WCfr is not executed by the secondary brake actuator BRKs. When electricity is supplied to the differential pressure control valve SS3 by the secondary brake control unit ECUbs, the valve position of the differential pressure control valve SS3 is controlled to be in a closed state, so that the differential pressure generating state is established at the differential pressure control valve SS3. A check valve cv7 is provided in parallel to the differential pressure control valve SS3 to bypass the differential pressure control valve SS3 in the event that the hydraulic pressure upstream of the differential pressure control valve SS3 becomes greater than the hydraulic pressure downstream of the differential pressure control valve SS3.

Downstream of the differential control valve SS3, the conduit LI branches into conduits LIfls and LIfrs, which re-merge upstream of circuit HP1. Pressure increase control valves SZfls and SZfrs for controlling a pressure increase of the brake hydraulic pressure supplied to brake circuit HP1 are provided at the conduits LIfl and LIfr. Because they are provided in parallel, pressure increase control valves SZfls and SZfrs are energized in tandem by the secondary brake control unit ECUbs. Check valves cv8 and cv9 are provided in parallel to the pressure increase control valves SZfls and SZfrs, respectively, to bypass the respective pressure increase control valve SZfls or SZfrs in the event that the hydraulic pressure downstream of the respective pressure increase control valve SZfls or SZfrs becomes greater than the hydraulic pressure upstream of the respective pressure increase control valve SZfls or SZfrs.

A conduit LJ used for decreasing the brake hydraulic pressure extends from a regulating reservoir R3 and branches into conduits LJfl and LJfr. Conduit LJfl connects the regulating reservoir R3 to a portion of the conduit LIfl extending between the pressure increase control valve SZfls and the re-merger of conduits LIfl and LIfr, and conduit LJfr connects the regulating reservoir R3 to a portion of the conduit LIfr extending between the pressure increase control valve SZfrs and the re-merger of conduits LIfl and LIfr. Pressure decrease control valve SGfls is provided in conduit LJfl, and pressure decrease control valve SGfrs is provided in conduit LJfr. Because they are provided in parallel, pressure decrease control valves SGfls and SGfrs are energized in tandem by the secondary brake control unit ECUbs.

A conduit LK is provided between the regulating reservoir R3 and the conduit LI, and connects to the conduit LI at or upstream of the split of the conduit LI into LIfl and LIfr, and downstream of the differential pressure control valve SS3. A conduit LL is provided between the regulating reservoir R3 and the master cylinder MC. A hydraulic pump OP3 operatively connected to an electric motor MT2 is provided at the conduit LK. When the electric motor MT2 is energized by the secondary brake control unit ECUbs to cause the hydraulic pump OP3 to be driven by the electric motor MT2, brake fluid sucked by the hydraulic pump OP3 from the regulating reservoir R3, is discharged to the master cylinder MC or the brake circuit HP1 of the primary brake actuator BRKp.

The brake circuit HP4 is similar to the brake circuit HP3 except that it supplies brake fluid to the brake circuit HP2 of the primary brake actuator BRKp. The differential pressure control valve SS4, pressure increase control valves SZrls and SZrrs, pressure decrease control valves SGrls and SGrrs, chech valves cv10, cv11, and cv12, regulating reservoir R4, hydraulic pump OP4, and conduits LM, LMrl, LMrr, LN, LNrl, LNrr, LO and LP of the brake circuit HP4 are arranged and function in a manner corresponding to that of the differential pressure control valve SS3, pressure increase control valves SZfls and SZfrs, pressure decrease control valves SGfls and SGfrs, check valves cv7, cv8, and cv9, regulating reservoir R3, hydraulic pump OP3, and conduits LI, LIfl, LIfr, LJ, LJfl, LJfr, LK, and LL of the brake circuit HP3.

In the embodiment, the secondary brake actuator BRKs has the same physical structure as the primary brake actuator BRKp. This permits an economy of scale in which both brake actuators BRKp and BRKs of the brake system can be manufactured together, thereby reducing costs. However, in an alternative embodiment, the secondary brake actuator can have a different structure in which the conduits corresponding to conduits LI, LJ, LM, and LN do not branch, and with only a single pressure increase control valve and pressure decrease control valve per brake circuit.

The main ECU is operatively connected to the primary brake control unit ECUbp to cause the primary brake actuator BRKp to individually adjust hydraulic pressure in the wheel cylinders WHfl, WHfr, WHrl, and WHrr during, for example, an anti-skid control (ABS control), a traction control (TCS control) or an electronic stability control (ESC control) in a known manner by providing appropriate electric current to the differential pressure control valves SS1 and SS2, pressure increase control valves SZfl, SZfr, SZrl, and SZrr, pressure decrease control valves SGfl, SGfr, SGrl, and SGrr, and motor MT1 for driving the hydraulic pumps OP1 and OP2. Furthermore, the main ECU is operatively connected to both the primary brake control unit ECUbp and the secondary brake control unit ECUbs to cause the primary brake actuator BRKp and the secondary brake actuator BRKs to perform automatic brake hold, as discussed in detail below.

Additionally, while one of the primary or secondary actuator BRKp or BRKs is being used, the other can run a self-diagnostic. And if one of the primary or secondary actuator BRKp or BRKs fails, the other actuator can be used for emergency braking of the vehicle, if needed. Additionally, the primary or secondary actuator BRKp or BRKs can be used in place of an Electronic Parking Brake (EPB), or as a backup parking brake function in the event of failure of an EPB. Furthermore, the secondary actuator BRKs could perform a rudimentary form of ABS control in which the hydraulic pressures of the front wheels as a pair or the rear wheels as a pair are reduced, for example, if the primary actuator BRKp becomes disabled.

The main ECU monitors the need for automatic brake hold control by monitoring the vehicle movement. When the vehicle brakes to a stop, and the driver releases the brake pedal, the main ECU determines that the vehicle is to be automatically held to keep the vehicle at a stop. When the driver takes action to resume motion (e.g., pressing the accelerator pedal), the brake torque is released so that full control is restored to the driver.

When the primary brake actuator BRKp commences automatic brake hold control, the differential pressure control valves SS1 and SS2 are put in the differential pressure control state and the hydraulic pumps OP1 and OP2 (and motor MT1) actuated until the appropriate wheel cylinder hydraulic pressures are reached in each wheel cylinder WCfl, WCfr, WCrl, and WCrr, at which point the corresponding pressure increase control valve SZfl, SZfr, SZrl or SZrr is energized to hold the wheel cylinder hydraulic pressures.

Similarly, when the secondary brake actuator BRKs commences automatic brake hold control, the differential pressure control valves SS3 and SS4 are put in the differential pressure control state and the hydraulic pumps OP3 and OP4 (and motor MT2) actuated until the appropriate wheel cylinder hydraulic pressures are reached in each wheel cylinder pair WCfl/WCfr and WCrl/WCrr, at which point the corresponding pressure increase control valve pair (SZfls/SZfrs or SZrls/SZrrs) is energized to hold the wheel cylinder hydraulic pressures.

As discussed above, it is advantageous to distribute usage of the primary battery BATTp and the secondary battery BATTs. Accordingly, in an exemplary embodiment, when automatic brake hold control is to be performed, the main ECU determines which brake actuator most recently performed automatic brake hold control, and selects the other brake actuator to commence the automatic brake hold control. Furthermore, a switching of the automatic brake hold can be implemented by the main ECU in which, after a predetermined time (for example, 2 or 3 minutes) during which one of the actuators is used for automatic brake hold control, the other actuator is used for the automatic brake hold control.

Figure 3:
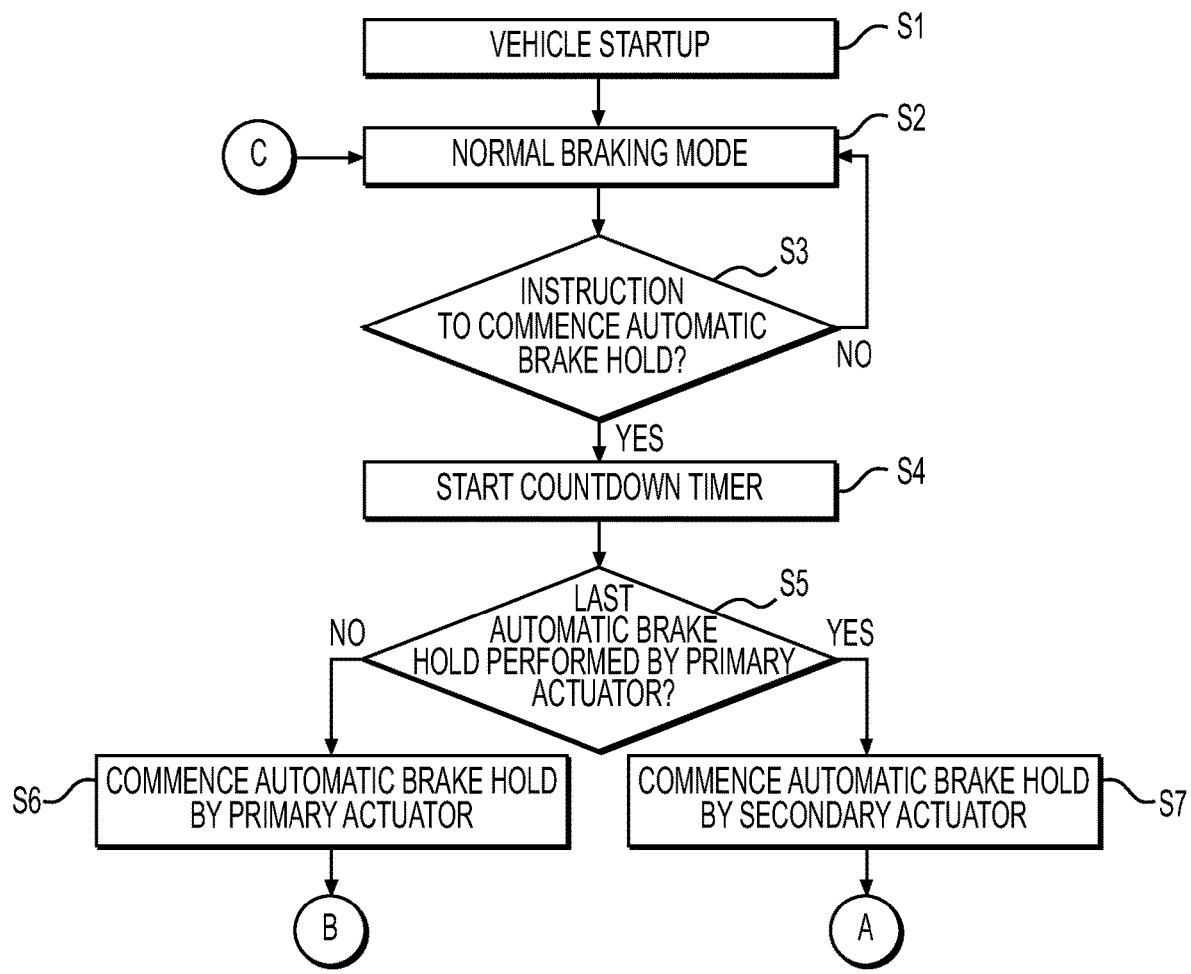
FIG. 3 illustrates a first aspect of a method of automatic brake hold control according to an exemplary embodiment.
Figure 4:
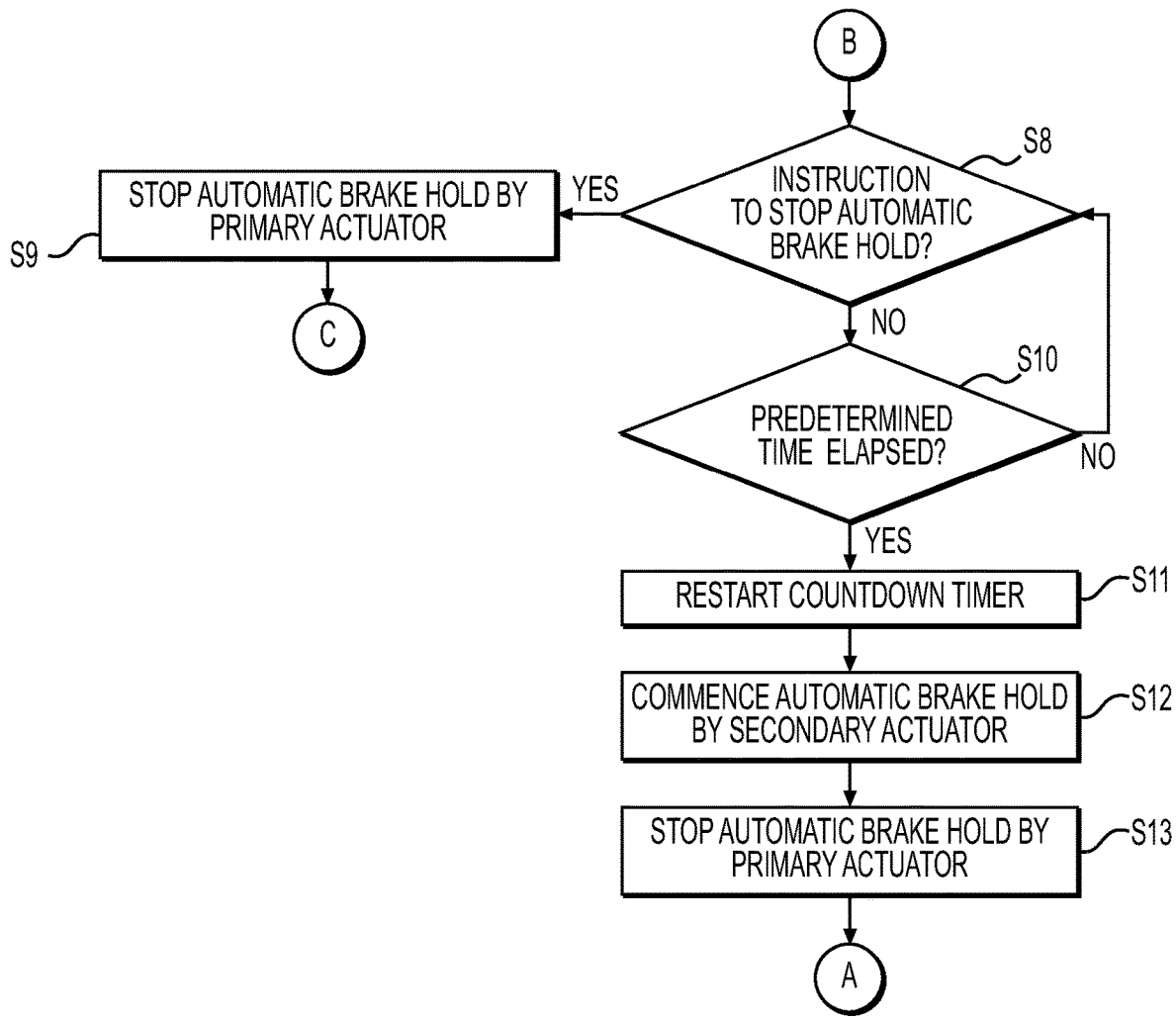
FIG. 4 illustrates a second aspect of a method of automatic brake hold control according to an exemplary embodiment.
Figure 5:
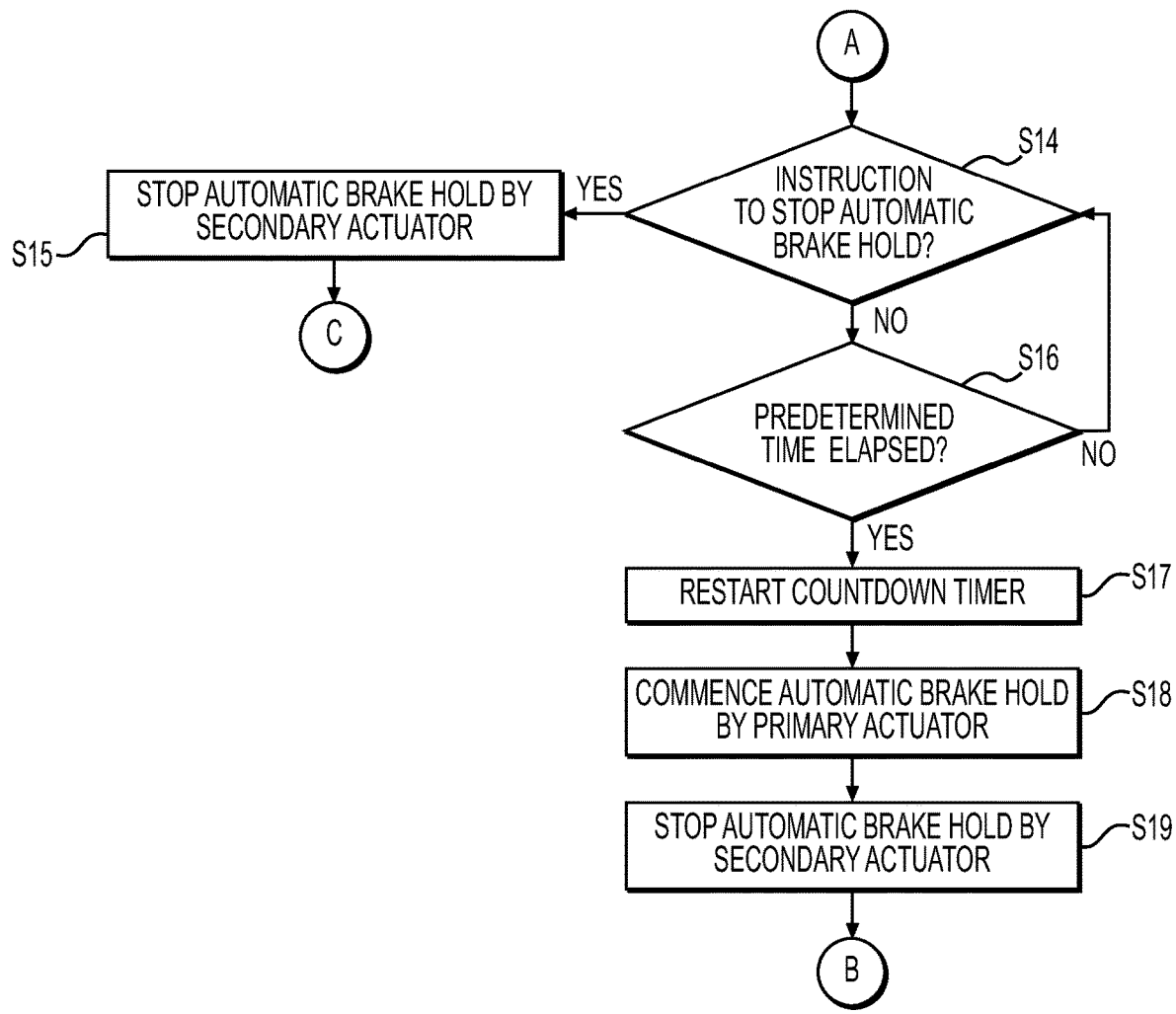
FIG. 5 illustrates a third aspect of a method of automatic brake hold control according to an exemplary embodiment.

FIGS. 3-5 illustrate an exemplary control method according to the foregoing. A normal braking mode in which, for example, the brake pressure is determined by the brake pedal force/master cylinder hydraulic pressure is entered in Step S2 after normal vehicle startup (Step S1) or after automatic brake hold has been stopped by the primary actuator in Step S9 or the secondary actuator in Step S15, which are discussed below. If an instruction to commence automatic brake hold (Step S3) is not received, normal braking hold is maintained; otherwise, a countdown timer (for a predetermined time of, for example, 2 or 3 minutes) is started (Step S4), and it is determined whether or not the last automatic brake hold control was performed by the primary brake actuator (Step S5). If the last automatic brake hold control was not performed by the primary brake actuator, automatic brake hold by the primary actuator is commenced (Step S6). Otherwise, automatic brake hold by the secondary actuator is commenced (Step S7)

After commencement of automatic brake hold by the primary actuator (Step S6, or Step S18 discussed below), it is determined whether an instruction to stop automatic brake hold is received (Step S8), or whether the countdown timer has determined that the predetermined time has elapsed (Step S10). If it is determined that an instruction to stop automatic brake hold is received (Step S8), automatic brake hold by the primary actuator is stopped (Step S9) and normal brake mode is resumed (Step S2). If the countdown timer has determined that the predetermined time has elapsed (Step S10), the countdown timer is restarted (Step S11), automatic brake hold by the secondary actuator is commenced (Step S12), and automatic brake hold by the primary actuator is stopped (Step S13).

After commencement of automatic brake hold by the secondary actuator (Step S7 or Step S12), it is determined whether an instruction to stop automatic brake hold is received (Step S14), or whether the countdown timer has determined that the predetermined time has elapsed (Step S16). If it is determined that an instruction to stop automatic brake hold is received (Step S14), automatic brake hold by the secondary actuator is stopped (Step S15), and normal brake mode is resumed (Step S2). If the countdown timer has determined that the predetermined time has elapsed (Step S16), the countdown timer is restarted (Step S17), automatic brake hold by the primary actuator is commenced (Step S18), and automatic brake hold by the secondary actuator is stopped (Step S19).

The detailed description above describes embodiments of series connected dual brake actuators and an automatic brake hold method. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A brake system comprising:
   a primary brake actuator;
   a secondary brake actuator connected in series with and upstream of the primary brake actuator; and
   at least one wheel cylinder configured to apply brake torque to a wheel of a vehicle based on a hydraulic pressure increased or decreased by the primary actuator or the secondary actuators;
   wherein the primary brake actuator and the secondary brake actuator each have two input ports and four output ports; and
   two output ports of the secondary brake actuator are connected to one input port of the primary brake actuator, and the remaining two output ports of the secondary brake actuator are connected to the other input port of the primary brake actuator.

2. The brake system of claim 1, wherein the primary brake actuator is powered by a first battery, and the second brake actuator is powered by a second battery different from the first battery.

3. The brake system of claim 1, wherein the primary brake actuator and the secondary brake actuator are each configured to perform an automatic brake hold control.

4. The brake system of claim 1, wherein the primary brake actuator and the secondary brake actuator each comprise a pump configured to pump brake fluid to increase or decrease the hydraulic pressure applied to the at least one wheel cylinder.

5. The brake system of claim 1, wherein the at least one wheel cylinder comprises four wheel cylinders, and the primary brake actuator is configured to individually increase and decrease the hydraulic pressure applied to each of the four wheel cylinders.

6. The brake system of claim 1, wherein the at least one wheel cylinder comprises two pairs of two wheel cylinders, and the secondary brake actuator is configured to individually increase and decrease the hydraulic pressure applied to each of the two pairs of two wheel cylinders.

7. The brake system of claim 1, wherein the primary brake actuator and the secondary brake actuator each comprise at least one differential pressure control valve.

8. The brake system of claim 1, wherein the primary brake actuator and the secondary brake actuator each comprise at least one normally-opened pressure increase control valve.

9. The brake system of claim 1, wherein the primary brake actuator and the secondary brake actuator each comprise at least one normally-closed pressure decrease control valve.

\* \* \* \* \*